United States Patent
Bennett et al.

(10) Patent No.: US 8,406,764 B1
(45) Date of Patent: Mar. 26, 2013

(54) BICASTING TRAFFIC DATA DURING A HANDOVER

(75) Inventors: Anthony D. Bennett, Plano, TX (US);
Frank O. Scott, Pakenham (CA);
Wesley R. Erhart, McKinney, TX (US);
Michael A. Brown, McKinney, TX (US)

(73) Assignee: Apple Inc., Cupertino, CA (US)

(*) Notice: Subject to any disclaimer, the term of this patent is extended or adjusted under 35 U.S.C. 154(b) by 1149 days.

(21) Appl. No.: 11/510,540

(22) Filed: Aug. 25, 2006

(51) Int. Cl.
*H04Q 7/24* (2006.01)

(52) U.S. Cl. .................... 455/436; 370/230

(58) Field of Classification Search .................... 455/439
See application file for complete search history.

(56) References Cited

U.S. PATENT DOCUMENTS

| | | | |
|---|---|---|---|
| 5,819,178 A | 10/1998 | Cropper | |
| 6,046,978 A | 4/2000 | Melnik | |
| 6,104,929 A | 8/2000 | Josse et al. | |
| 6,795,701 B1 | 9/2004 | Baker et al. | |
| 7,536,187 B2* | 5/2009 | Oswal et al. | 455/452.1 |
| 2002/0031131 A1 | 3/2002 | Yemini | |
| 2002/0032800 A1 | 3/2002 | Puuskari | |
| 2003/0117948 A1 | 6/2003 | Ton et al. | |
| 2003/0169712 A1 | 9/2003 | Tsao | |
| 2004/0203754 A1* | 10/2004 | Yi-Bing et al. | 455/432.1 |
| 2006/0050667 A1 | 3/2006 | Verma | |
| 2006/0062145 A1* | 3/2006 | Kirla | 370/230 |
| 2006/0083184 A1* | 4/2006 | Haumont et al. | 370/278 |
| 2006/0135159 A1* | 6/2006 | Andersen et al. | 455/435.1 |
| 2006/0274688 A1 | 12/2006 | Maxwell et al. | |
| 2007/0049278 A1* | 3/2007 | Lindoff et al. | 455/439 |
| 2007/0091862 A1* | 4/2007 | Ioannidis | 370/338 |

OTHER PUBLICATIONS

3rd Generation Partnership Project, "3GPP TS 23.060 V6.12.0 (Mar. 2006), 3rd Generation Partnership Project; Technical Specification Group Services and System Aspects; General Packet Radio Service (GPRS); Service Description; Stage 2 (Release 6)," pp. 1-212 (2006).
3rd Generation Partnership Project, "3GPP TS 23.873 V4.0.0 (Mar. 2001), 3rd Generation Partnership Project; Technical Specification Group Services and System Aspects; Feasibility Study for Transport and Control Separation in the PS CN Domain (Release 4)," pp. 1-91 (2001).
3rd Generation Partnership Project, "3GPP TS 29.060 V6.12.0 (Mar. 2006), 3rd Generation Partnership Project; Technical Specification Group Core Network and Terminals; General Packet Radio Service (GPRS); GPRS Tunnelling Protocol (GTP) Across the Gn and Gp Interface (Release 6)," pp. 1-134 (2006).

(Continued)

*Primary Examiner* — George Eng
*Assistant Examiner* — Joseph Dean, Jr.
(74) *Attorney, Agent, or Firm* — Meyertons, Hood, Kivlin, Kowert & Goetzel, P.C.

(57) ABSTRACT

Handover is performed from a first radio network controller to a second radio network controller, where the first and second radio network controllers are associated with corresponding first and second control nodes. An access gateway node receives at least one command that is transmitted by one of the first and second control nodes associated with the respective first and second radio network controllers, where the access gateway node contains data functions of the first and second control nodes. In response to the at least one command, the access gateway node bicasts traffic data from the data functions for receipt by the first and second radio network controllers.

20 Claims, 3 Drawing Sheets

OTHER PUBLICATIONS

3rd Generation Partnership Project, "3GPP TS 43.064 V6.10.0 (Jan. 2006), 3rd Generation Partnership Project; Technical Specification Group GSM/EDGE Radio Access Network; General Packet Radio Service (GPRS); Overall Description of the GPRS Radio Interface, Stage 2 (Release 6)," pp. 1-68 (2006).

3rd Generation Partnership Project, "3GPP TS 44.064 V6.1.0 (Sep. 2005), 3rd Generation Partnership Project; Technical Specification Group Core Network; Mobile Station—Serving GPRS Support Node (MS-SGSN); Logical Link Control (LLC) Layer Specification (Release 6)," pp. 1-62 (2005).

3rd Generation Partnership Project, "3GPP TS 44.065 V6.5.0 (Sep. 2005), 3rd Generation Partnership Project; Technical Specification Group Core Network and Terminals; Mobile Station (MS)—Serving GPRS Support Node (SGSN); Subnetwork Dependent Convergence Protocol (SNDCP) (Release 6)," pp. 1-51 (2005).

3rd Generation Partnership Project, "3GPP TS 48.014 V6.0.0 (Feb. 2005), 3rd Generation Partnership Project; Technical Specification Group GSM EDGE Radio Access Network; General Packet Radio Service (GPRS); Base Station System (BSS)—Serving GPRS Support Node (SGSN) Interface; Gb Interface Layer 1 (Release 6)," pp. 1-8 (2005).

3rd Generation Partnership Project, "3GPP TS 48.016 V6.5.0 (Nov. 2005), 3rd Generation Partnership Project; Technical Specification Group GSM EDGE Radio Access Network; General Packet Radio Service (GPRS); Base Station System (BSS)—Serving GPRS Support Node (SGSN) Interface; Network Service (Release 6)," pp. 1-58 (2005).

3rd Generation Partnership Project, "3GPP TS 48.018 V6.12.0 (Jan. 2006), 3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 6)," pp. 1-150 (2006).

Network Working Group, RFC 1035, "Domain Names—Implementation and Specification," pp. 1-54 (Nov. 1987).

Ericsson et al., "GPRS One Tunnel for Roaming," pp. 1-7 (May 2006).

3rd Generation Partnership Project, "3GPP TS 43.129 V6.2.0 (Apr. 2005), 3rd Generation Partnership Project; Technical Specification Group GERAN; Packet-Switched Handover for GERAN A/Gb Mode; Stage 2 (Release 6)," pp. 1-67 (2005).

S.W. Maxwell et al., U.S. Appl. No. 11/448,244, entitled "Providing a Data Function in an Access Gateway Node," filed Jun. 7, 2006, pp. 1-25, Figs. 1-8.

US Patent Office, International Search Report and Written Opinion for International Application, No. PCT US2006/022003, 8 pages, Feb. 21, 2008.

U.S. Appl. No. 11/448,244. Office Action dated Jan. 7, 2009, pp. 1-16 with attachments.

U.S. Appl. No. 11/448,244. Office Action dated Jun. 30, 2008, pp. 1-11 with attachments.

U.S. Appl. No. 11/448,244. Office Action dated Dec. 28, 2009, pp. 1-11 with attachments.

U.S. Appl. No. 11/448,244, Non-Final Rejection dated Jun. 22, 2010, pp. 1-4 and attachments.

U.S. Appl. No. 11/448,244, Notice of Allowance dated Sep. 2, 2010 (9 pages).

* cited by examiner

BICASTING TRAFFIC DATA DURING A HANDOVER

TECHNICAL FIELD

The invention relates generally to bicasting traffic data during a handover of a mobile station between radio network controllers.

BACKGROUND

Mobile or wireless communications networks are capable of carrying both circuit-switched and packet-switched traffic (e.g., voice traffic, data traffic, etc.) between mobile stations and other endpoints, which can be another mobile station or an endpoint connected to a network such as a public-switched telephone network (PSTN) or a packet data network (e.g., local area networks, the Internet, and so forth). Examples of wireless communications networks that support communication of packet-switched traffic include those that operate according to the GSM (Global System for Mobile) or UMTS (Universal Mobile Telecommunications System) standards, as defined by the Third Generation Partnership Project (3GPP).

Current GSM/UMTS networks include a GPRS (General Packet Radio Services) core network for providing packet services, such as Internet Protocol (IP) packet services. The GPRS core network includes a Serving GPRS Support Node (SGSN) and a Gateway GPRS Support Node (GGSN). The GGSN is a gateway between the GPRS core network and an external packet data network. In the uplink direction, the GGSN detunnels subscriber data traffic received from the SGSN and sends out data packets (such as IP packets) over the external data network. In the downlink direction, the GGSN receives IP packets from the external data network and tunnels subscriber data traffic to the SGSN. The SGSN performs various tasks, including mobility management, session management, billing, and so forth.

A mobile communications network includes coverage areas (referred to as cells) that are supported by respective radio access networks. The radio access networks include respective base transceiver stations (BTSs) or access points (APs) for wirelessly communicating with mobile stations in respective coverage areas. The radio access networks also include a radio network controller (RNC) or base station controller (BSC) that is connected to a respective BTS or AP.

When a mobile station moves from one coverage area to another coverage area, a handover procedure is performed to transition the mobile station between the different coverage areas. The transition of the mobile station between the coverage areas involves a transition between different radio access networks (from a source radio access network to a target radio access network) and possibly between different SGSNs (from a source SGSN to a target SGSN).

During a handover procedure, delays in communicating traffic data to a mobile station may result from the fact that a core network may not know which SGSN and/or RNC is supporting communications with the mobile station that is moving between coverage areas. For example, packets sent by the core network to a mobile station may experience extra delay due to data packets having to be forwarded from a GGSN through an SGSN to a source RNC, and then from the source RNC to a target RNC. The extra delay in the communication of traffic data from the core network to a mobile station while the mobile station is transitioning between coverage areas may cause service interruptions for latency-sensitive applications such as voice-over-IP (Internet Protocol) communications or other forms of real-time communications in wireless communications networks.

SUMMARY

In general, methods and apparatus are provided to reduce latency associated with communicating traffic data to a mobile station during the transition of the mobile station between coverage areas in a wireless communications network.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
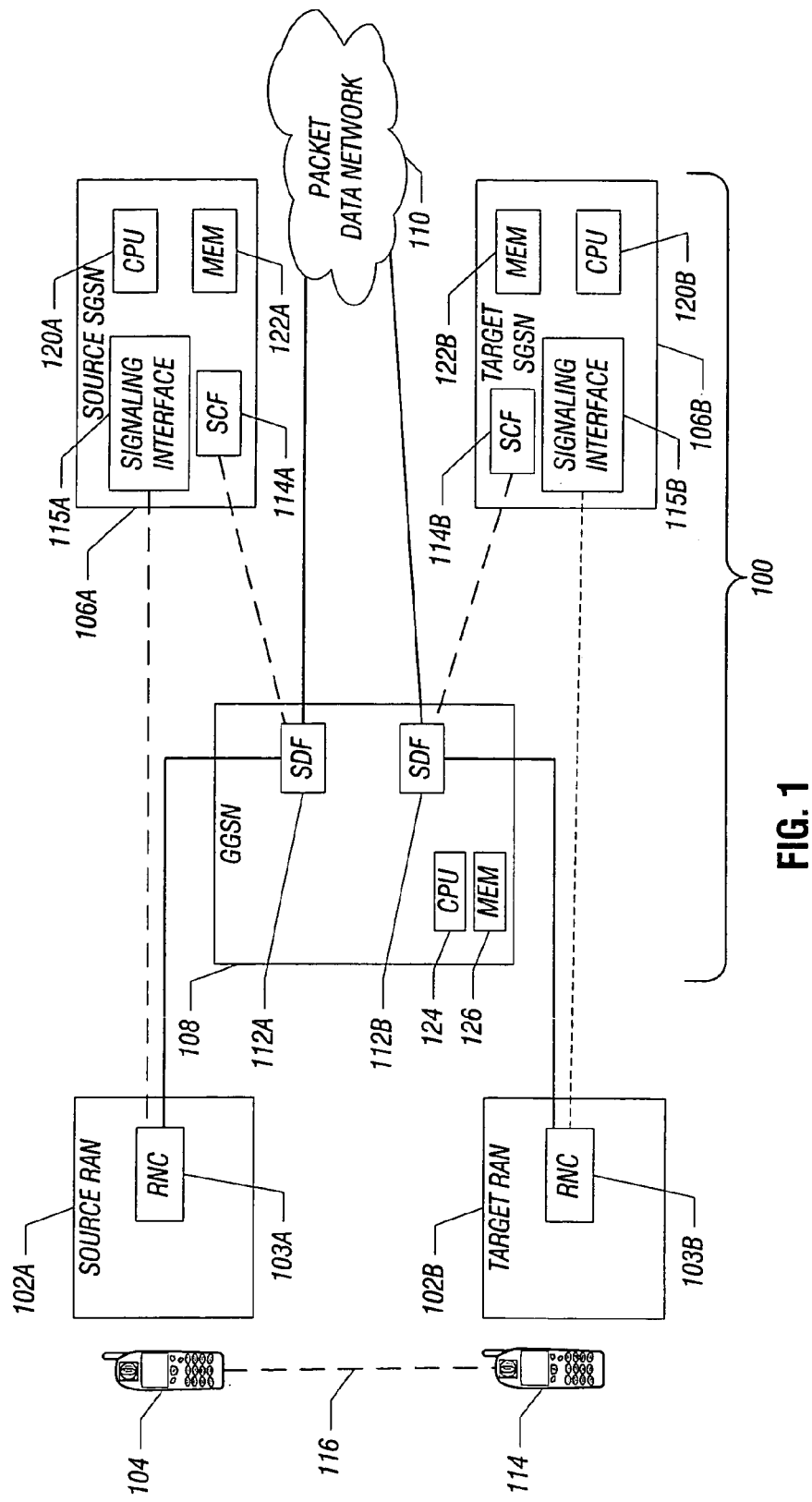
FIG. 1 is a block diagram of an example wireless communications network that incorporates an embodiment of the invention.

FIG. 1 shows an example arrangement of a wireless communications network, according to some embodiments. The wireless communications network depicted in FIG. 1 is a GSM (Global System for Mobile) or UMTS (Universal Mobile Telecommunications System) wireless communications network. The GSM/UMTS wireless communications network includes a GPRS (General Packet Radio Service) core network 100 and includes 2G (Second Generation) and/or 3G (Third Generation) radio access networks 102A, 102B for communicating wirelessly with a mobile station 104 (or multiple mobile stations). Note that both 2G and 3G radio access networks can be concurrently present in a wireless communications network.

The core network 100 includes Serving GPRS Support Nodes (SGSNs) 106A, 106B and Gateway GPRS Support Nodes (GGSNs) 108 (only one depicted in FIG. 1). Each SGSN 106 (106A or 106B) is coupled between a respective radio access network 102A, 102B and a GGSN 108. Each radio access network 102A, 102B includes a respective radio network controller (RNC) 103A, 103B. Although two SGSNs and two RNCs are depicted in FIG. 1, it is noted that additional SGSNs and RNCs would usually be present. Also, note that the term "RNC" is intended to also cover a base station controller (BSC). An RNC is used to control an access point (AP) or base transceiver station (BTS) that is part of a radio access network. The AP or BTS communicates wirelessly with mobile stations using radio frequency (RF) links.

The tasks performed by each SGSN include mobility management, session management, billing, and so forth. Each GGSN 108 is effectively a gateway between the core network 100 and an external data network 110, such as the Internet or some other type of network. The external data network 110 can be a packet data network that performs packet-switched communications, such as Internet Protocol (IP) communications. One version of IP is described in Internet Engineering Task Force (IETF) Request for Comments (RFC) 791, entitled "Internet Protocol," dated September 1981; and another version of IP is described in RFC 2460, entitled "Internet Protocol, Version 6, IPv6 Specification," dated December 1998.

Conventionally, each SGSN and GGSN includes a respective user data plane for routing subscriber data traffic. Also, each conventional SGSN and GGSN also includes a respective control plane. The data plane of a conventional SGSN can be considered to include a subscriber data function (SDF) that performs data packet routing and transfer tasks, with the SDF forwarding packets from an access network (such as the radio access network 102A or 102B) to a GGSN in the uplink direction, and from the GGSN to the access network in the downlink direction. The control plane of a conventional SGSN can be considered to include a subscriber control function (SCF) that performs mobility management and subscriber management, such as those described in 3GPP TS 23.060. The SCF controls operations of the SDF in a conventional SGSN.

The term "function" used in the context of a subscriber data function or subscriber control function refers to hardware and/or software of the corresponding data plane or control plane. Software modules in the SGSNs 106A, 106B and in the GGSN 108 are executable on respective central processing units (CPUs) 120A, 120B, and 124. The CPUs 120A, 120B, and 124 are connected to respective memories 122A, 122B, and 126 (which can be any type of storage such as volatile storage devices or persistent storage devices).

In accordance with some embodiments, instead of providing both the SCF and SDF of the SGSN in the SGSN, the SCF and SDF are separated such that the SCF resides in the SGSN and the SDF resides in the GGSN. SDFs are identified by reference numerals 112A, 112B in FIG. 1, where SDF 112A is associated with SGSN 106A, and SDF 112B is associated with SGSN 106B. SCFs 114A and 114B are provided in respective SGSNs 106A, 106B.

By distributing SGSN SDFs across the GGSNs 108 of the wireless communications network rather than in the SGSNs, more efficient usage of the SDF components can be accomplished. The dashed lines of FIG. 1 indicate control links (over which control messages are communicated), while the solid lines between the GGSNs 108 and radio access networks 102A, 102B represent traffic links over which subscriber traffic data is communicated. "Traffic data" refers to bearer data (such as voice data, multimedia data, text data, etc.) communicated between endpoints (such as between two mobile stations or between a mobile station and a station connected to the packet data network 110.

The GGSN 108 also includes a GGSN control plane and a GGSN data plane (not shown). The GGSN control plane and data plane are unmodified from conventional GGSN control and data planes. Thus, in some implementations, the GGSN 108 includes both the data plane of the GGSN as well as the data planes of corresponding SGSNs.

The SGSNs 106 and GGSNs 108 of FIG. 1 are referred to as direct-tunnel SGSNs (DT-SGSNs) and direct-tunnel GGSNs (DT-GGSNs). The term "direct-tunnel" refers to the arrangement according to some embodiments where an SGSN SDF is moved out of the SGSN and into the GGSN. In the ensuing discussion, DT-SGSNs and DT-GGSNs are simply referred to as SGSNs and GGSNs. Direct tunneling enables a GGSN to communicate traffic data directly with an RNC, since the GGSN includes the SDF of the SGSN. In the non-direct tunneling context, downlink and uplink traffic data has to be communicated through the SGSN between the RNC and GGSN. Further details regarding DT-SGSNs and DT-GGSNs are provided in U.S. Ser. No. 11/448,244, entitled "Providing a Data Function in an Access Gateway Node," filed Jun. 7, 2006.

Each SCF 114A, 114B performs control tasks with respect to a respective SDF 112A, 112B in the GGSN 108. Each SGSN 106A, 106B also includes a signaling interface 115A, 115B to a respective radio access network 102A, 102B for communicating control messages, such as IuPS control messages or other types of control messages.

Thus, as depicted in FIG. 1, traffic data is communicated between a radio access network 102A, 102B and a respective SDF 112A, 112B in the GGSN 108, while control traffic is communicated between the radio access network 102A, 102B and a respective SGSN 106A, 106B. A direct data link is thus established between a radio access network and the GGSN (rather than through the SGSN as conventionally done).

As further depicted in FIG. 1, the mobile station 104 can move (as indicated by dashed arrow 116) from a first coverage area (associated with the source radio access network 102A) to a different coverage area (associated with a target radio access network 102B). As a result of movement of the mobile station 104 between the coverage areas as depicted in FIG. 1, a handover procedure is performed to allow transition from a source radio network controller (RNC) and source SGSN to the target RNC and SGSN.

One example type of handover procedure that can be performed is a serving RNS (radio network subsystem) (SRNS) handover procedure provided by 3GPP standards, such as that described in 3GPP TS 23.060. An SRNS handover procedure is a UMTS handover procedure. In other embodiments, other handover procedures can be performed. For example, one example of another handover procedure is a PS (packet-switched) handover procedure, which is a GPRS handover procedure, defined by 3GPP TS 43.129. Both an SRNS handover procedure and PS handover procedure are described further below.

In accordance with some embodiments, to reduce latency of communicating traffic data during a handover procedure, bicasting of traffic data is performed in which traffic data is sent from the GGSN to both the source and target RNCs. The term "bicast" refers to one node sending a particular piece of traffic data (which can be one or multiple data packets) to two other nodes. Bicasting traffic data from a shared or common GGSN, such as GGSN 108 in FIG. 1, directly to both the source and target RNCs 103A, 103B helps to reduce delay associated with the communication of the traffic data (in the downlink path) from the core network 100 to the mobile station 104. By bicasting the traffic data to both the source and target RNCs directly from the GGSN 108, delays associated with communicating traffic data from the GGSN to the SGSN, and from forwarding traffic data from the source RNC to target RNC, can be avoided. Latency is also reduced due to the fact that the SDFs of the SGSNs are integrated into the GGSN 108. As a result, traffic data does not have to pass through an SGSN en route between the GGSN and RNCs. Thus, in the present context, the sending of data "directly" from a GGSN to an RNC means that the data sent from the GGSN to the RNC does not have to pass through an SGSN.

During the handover procedure, if the mobile station 104 is still communicating with the source RNC 103A, then the source RNC 103A will transmit the traffic data (bicasted to the source RNC 103A from the GGSN 108) to the mobile station 104. On the other hand, if the mobile station 104 has already moved and is communicating with the target RNC 103B, then the target RNC 103B will transmit the traffic data (bicasted to the target RNC 103B from the GGSN 108) to the mobile station 104. By reducing latency associated with transmitting traffic data to the mobile station 104 in the downlink direction during a handover procedure, service interruptions for latency-sensitive applications such as voice-over-IP communications or other real-time communications can be reduced or eliminated.

It is further noted that the SDFs 112A, 112B associated with the source and target SGSNs 106A, 106B that are part of a common bearer (user) plane residing in the GGSN provides the added benefit of simplifying management of the bearer plane resources in the GGSN during a handover procedure. Conventionally, since the SDFs (bearer planes) reside in separate source and target SGSNs during a handover, management of the bearer plane is made more complex.

Moreover, some embodiments of the invention enable the handover of a mobile station between RNCs without incurring excessive downlink traffic data delays even if the Iur interface between RNCs is not used. The Iur interface is an interface defined by 3GPP standards to support handovers between RNCs.

As noted above, SGSNs and GGSNs are employed in GSM/UMTS wireless communications networks. Techniques according to some embodiments can be applied to other types of wireless communications networks. More generally, a GGSN can be considered a type of access gateway node, which is provided at the edge of a wireless communications network for routing data between a mobile station in the wireless communications network and external network devices coupled to an external data network. An SGSN can be considered a type of control node in the wireless communications network to provide various control tasks, such as mobility management, billing, and so forth.

Figure 2:
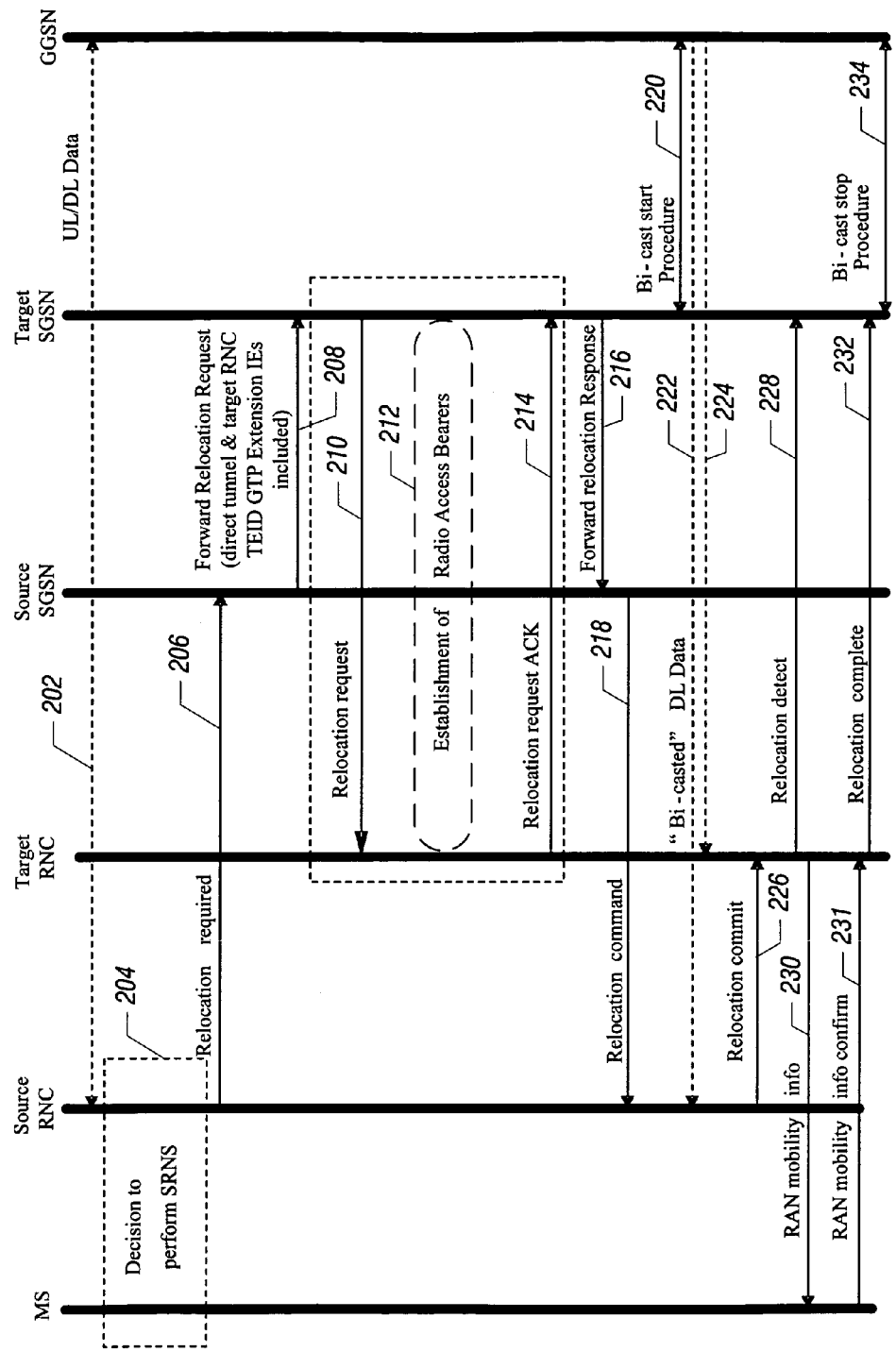
FIG. 2 is a message flow diagram of a handover procedure for a mobile station, in accordance with an embodiment.

FIG. 2 illustrates a message flow diagram that depicts a handover procedure according to an embodiment. The handover procedure illustrated in FIG. 2 is a 3G-3G SRNS handover procedure, which refers to an SRNS handover procedure involving two 3G RNCs. Some of the messages referred to in the message flow diagram of FIG. 2 are defined by 3GPP TS 23.060.

As depicted in FIG. 2, initially, prior to movement of a mobile station (MS) (e.g., mobile station 104 in FIG. 1) out of a coverage area served by a source RNC (e.g., 103A in FIG. 1), uplink and downlink data is communicated (at 202) between the source RNC and the GGSN (e.g., GGSN 108). The communication of the uplink and downlink traffic data between the source RNC and the GGSN allows the mobile station to perform communications (such as voice-over-IP communications, web browsing communications, e-mail communications, and so forth) with another endpoint, which can be another mobile station or an endpoint connected to the external data network 110 (FIG. 1).

As the mobile station approaches the boundary between two different coverage areas, a decision is made (at 204) to perform an SRNS handover procedure. The decision to perform the handover can be based on various measurement reports indicating that the mobile station is moving from the source coverage area to a target coverage area. In response to the decision to perform the handover, the source RNC sends (at 206) a Relocation Required message to the source SGSN (e.g., 106A in FIG. 1) to indicate that a handover procedure is to be performed. The Relocation Required message contains a source ID and a target ID, where the source ID identifies the source RNC, and the target ID identifies the target RNC.

Based on the target ID, the source SGSN is able to determine whether the handover procedure is an inter-SGSN (involving two SGSNs) handover procedure or an intra-SGSN (involving one SGSN) handover procedure. In the FIG. 2 message flow, the handover procedure is an inter-SGSN handover procedure that involves the source SGSN and the target SGSN (e.g., SGSN 106B in FIG. 1). In the case of inter-SGSN handover, the source SGSN sends (at 208) a Forward Relocation Request message to the target SGSN, where the Forward Relocation Request message contains information elements (such as GTP extension information elements) indicating the following: direct tunnel is being supported; the target RNC TEID (tunnel endpoint identifier); identifiers of radio access bearers (RABs); and others. The TEID is an identifier used with GTP-U to tunnel subscriber data traffic between the GGSN and an RNC. In this case, the TEID is the TEID of the target RNC (which forms one of the tunnel endpoints) for communication of traffic data with the GGSN (which is the other endpoint of the tunnel).

GTP stands for GPRS Tunneling Protocol, with a version described by 3GPP TS 29.060. GTP is separated into GTP-C and GTP-U, where GTP-C is used within the GPRS core network for signaling between SGSNs and GGSNs. On the other hand, GTP-U is used for carrying user data within the GPRS core network and between the radio access network and core network. User data can be transported in IP packets through a GTP-U tunnel.

In response to the Forward Relocation Request message, the target SGSN sends (at 210) a Relocation Request message to the target RNC, which causes establishment (at 212) of radio access bearers between the target RNC and target SGSN. After all necessary resources for the radio access bearers have been allocated successfully, the target RNC sends (at 214) a Relocation Request Acknowledge message to the target SGSN. When resources for the transmission of user data between the target RNC and the target SGSN have been allocated and the target SGSN is ready for SRNS handover, the target SGSN sends (at 216) a Forward Relocation Response message to the source SGSN. The source SGSN continues the handover by sending (at 218) a Relocation Command message to the source RNC.

So far, the various messages described above for performing the SRNS handover procedure is described in greater detail in 3GPP TS 23.060. The variation from the TS 23.060 handover flow is in the content of the Forward Relocation Request message, which in accordance with some embodiments includes the target RNC TEID and an information element regarding whether direct tunneling is being utilized.

In accordance with some embodiments, after the target SGSN has sent (at 216) the Forward Relocation Response to the source SGSN, which indicates that resources for transmission of user data between the target RNC and the target SGSN have been allocated, the target SGSN also performs (at 220) a bicast start procedure with the GGSN. The bicast start procedure involves the target SGSN sending a bicast start command to the GGSN (followed by acknowledgment from the GGSN back to the target SGSN). The bicast start command is an indication to the GGSN that the GGSN can start bicasting data to both source and target RNCs in accordance with some embodiments. Although FIG. 2 depicts the target SGSN performing the bicast start procedure with the GGSN, it is noted that in an alternative implementation the source SGSN can perform the bicast start procedure with the GGSN, such as after receiving the Forward Relocation Response message (at 216) from the target SGSN.

In response, the GGSN bicasts downlink traffic data (at 222) to the source RNC and downlink traffic data (at 224) to the target RNC. As a result of transmission of the bicasted downlink traffic data from the GGSN to the target RNC, both the target RNC and the source RNC have a copy of the downlink traffic data. For example, in the arrangement of FIG. 1, the bicasted data is sent from the SDFs 112A, 112B to respective RNCs 103A, 103B. One of the RNCs 103A, 103B can in turn forward the downlink traffic data to the mobile station that is being handed over from the source RNC to the target RNC.

Next, the source RNC sends (at 226) a Relocation Commit message to the target RNC, which triggers the execution of handover to the target RNC. The target RNC then sends (at 228) a Relocation Detect message to the target SGSN when the relocation execution trigger is received, which relocation execution trigger is the reception of the Relocation Commit message from the source RNC.

Next, the target RNC sends (at 230) an RAN Mobility Information message to the mobile station, which contains the identity of the new target RNC and other information. In response, the mobile station sends (at 231) an RAN Mobility Information Confirm message to the target RNC which in turn sends (at 232) a Relocation Complete message to the target SGSN. The purpose of the Relocation Complete message is to provide an indication by the target RNC that completion of the handover has occurred. Again, the messages sent at 226, 228, 230, 231, and 232 are un-modified from the TS 23.060 specification.

In accordance with some embodiments, upon receipt of the Relocation Complete message, the target SGSN performs (at 234) a bicast stop procedure with the GGSN so that the GGSN no longer bicasts traffic data. The bicast stop procedure involves the target SGSN sending a bicast stop command to the GGSN, followed by any acknowledgments from the GGSN. The bicast stop command is an indication from the target SGSN to stop bicasting data from the GGSN. In response to the bicast stop command, the GGSN stops bicasting traffic data.

Figure 3:
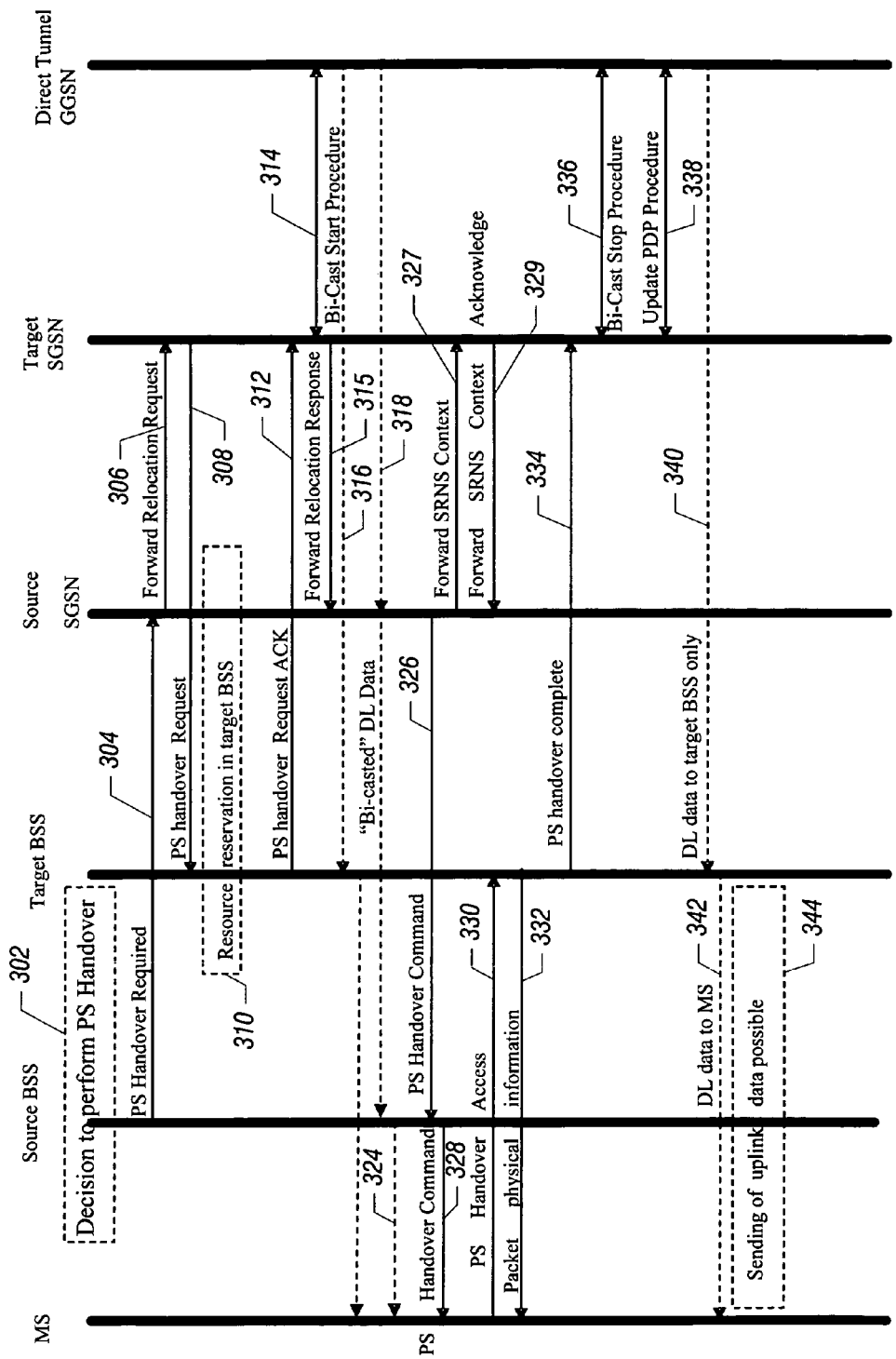
FIG. 3 is a message flow diagram of a handover procedure, in accordance with another embodiment.

FIG. 3 shows a handover procedure performed between 2G radio access networks (as opposed to the handover performed between 3G radio access networks in FIG. 2). In FIG. 3, BSS (base station subsystem) is equivalent to the radio access network referred to in FIGS. 1 and 2. A BSS includes a BSC and one or more BTSs. The handover depicted in FIG. 3 is a PS (packet-switched) handover, as provided by TS 43.129.

Initially, as depicted in FIG. 3, the source BSS decides (at 302) that PS handover is to be initiated. The source BSS sends (at 304) a PS Handover Required message to the source SGSN. The PS Handover Required message includes, among other information, a source cell identifier (to identify the source cell) and a target cell identifier (to identify the target cell).

The source SGSN determines from the target cell identifier that the type of handover requested is an inter-SGSN handover involving two SGSNs. For an inter-SGSN handover, the source SGSN sends (at 306) a Forward Relocation Request message to the target SGSN. The target SGSN then sends (at 308) a PS Handover Request message to the target BSS, which then performs resource reservation (at 310) to enable communication with the mobile station that is transitioning from the source BSS to the target BSS. Once resource reservation has been performed, the target BSS sends (at 312) a PS Handover Request Acknowledge message to the target SGSN.

In some implementations, the messages exchanged at 302, 304, 306, 308, 310, and 312 are un-modified from messages according to TS 43.129.

In accordance with some embodiments, in response to the PS Handover Request Acknowledge message, the target SGSN performs (at 314) a bicast start procedure with the GGSN to cause the GGSN to bicast downlink data to both the target BSS and source BSS (316, 318). The bicasted downlink data can be forwarded by the target BSS or source BSS to the mobile station (at 322, 324).

Instead of the target SGSN performing the bicast start procedure with the GGSN, it is noted that the source SGSN can alternatively perform the bicast start procedure with the GGSN.

The target SGSN next sends (at 315) a Forward Relocation Response message to the source SGSN to indicate that the target SGSN is ready to receive downlink packets. The source SGSN continues the PS handover by sending (at 326) a PS Handover Command message to the source BSS. The source BSS forwards the PS Handover Command message to the mobile station (at 328).

The source SGSN also sends (at 327) a Forward SRNS Context message to the target SGSN regarding context information to be used by the target SGSN. The target SGSN responds (at 329) with a Forward SRNS Context Acknowledge message.

In response to the PS Handover Command message received at 328, the mobile station tunes the radio channel and the time slot allocated to the target cell by the target BSS and sends a PS Handover Access message (at 330) to the target BSS. The target BSS then sends (at 332) a Packet Physical Information message to the mobile station containing the timing advance for synchronization of the mobile station.

The target BSS sends a PS Handover Complete message (at 334) to the target SGSN to inform the target SGSN that the mobile station has arrived in the target cell. The target SGSN then performs a bicast stop procedure (at 336) to inform the GGSN to stop bicasting downlink traffic data. The target SGSN also performs (at 338) an update PDP (Packet Data Protocol) procedure to update the PDP context. A PDP context is a logical association between to a mobile station and an external data network over a wireless access network.

Thereafter, downlink data is communicated by the GGSN (at 340) to the target BSS only (in other words, the GGSN stops bicasting traffic data to both the source and target BSS), and the target BSS in turn forwards (at 342) the downlink data to the mobile station. At this point, sending of uplink data from the mobile station to the GGSN (at 344) is also possible.

The above message flow diagrams show handover procedures between two 3G radio access networks (FIG. 2) and two 2G radio access networks (FIG. 3). In other embodiments, handover procedures can also be performed between a 2G radio access network and a 3G radio access network. In such handover procedures, bicast start and stop procedures similar to those depicted in FIGS. 2 and 3 are also performed between the target SGSN and the GGSN to enable the GGSN to bicast downlink traffic data to source and target RNCs/BSSs during the handover procedure.

Instructions of various software (e.g., including software in the GGSNs, SGSNs, and so forth) are loaded for execution on corresponding processors. Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While some embodiments have been disclosed with respect to a limited number of embodiments, those skilled in the art will appreciate numerous modifications and variations there from. It is intended that the appended claims cover such modifications and variations as fall within the true spirit and scope of the invention.

What is claimed is:

1. A method comprising:
performing handover from a first radio network controller to a second radio network controller, the first and second radio network controllers associated with corresponding first and second control nodes which are both associated with a shared access gateway node, including:
receiving, at the shared access gateway node, at least one command that is generated and transmitted by one of the first and second control nodes associated with the respective first and second radio network controllers; and
in response to the at least one command, the shared access gateway node bicasting traffic data from the data functions for receipt by the first and second radio network controllers,
wherein at least a portion of the bicast traffic data is sent from the shared access gateway node over direct data links to the corresponding first and second radio network controllers, the direct data links bypassing the first and second control nodes.

2. The method of claim 1, wherein the shared access gateway node comprises a gateway GPRS support node (GGSN), and wherein bicasting the traffic data is performed by the GGSN.

3. The method of claim 2, wherein the control nodes comprise serving GPRS support nodes (SGSNs), and wherein receiving the command comprises receiving the command from one of the SGSNs.

4. The method of claim 3, wherein bicasting the traffic data is performed from data functions in the GGSN, wherein the data functions in the GGSN comprise data functions of the SGSNs.

5. The method of claim 1, wherein bicasting the traffic data is performed during handover between two 3G radio access networks.

6. The method of claim 1, wherein bicasting the traffic data is performed during handover between radio access networks.

7. The method of claim 1, wherein bicasting the traffic data is performed during handover between a 3G radio access network and a 2G radio access network.

8. The method of claim 1, further comprising:
receiving, at the shared access gateway node, at least another command to stop the bicasting in response to an indication that the handover is complete.

9. The method of claim 1, wherein bicasting the traffic data comprises:
sending at least a portion of the traffic data from a first data function to the first radio network controller, wherein the traffic data sent from the first data function to the first radio network controller bypasses the first control node that communicates control messages with the first radio network controller; and
sending at least a portion of the traffic data from a second data function to the second radio network controller, wherein the traffic data sent from the second data function to the second radio network controller bypasses the second control node that communicates control messages with the second radio network controller.

10. An article comprising at least one storage medium containing instructions that when executed cause a first control node to:
receive a message indicating that handover between radio access networks is requested; and
send a command to an access gateway node shared by a source and target radio network controllers to cause the shared access gateway node to bicast traffic data to the radio network controllers in the corresponding radio access networks,
wherein at least a portion of the bicast traffic data is sent over direct data links between the shared access gateway node and the respective source and target radio network controllers, the direct data links bypassing the first control node.

11. The article of claim 10, wherein the first control node comprises a serving GPRS support node, and wherein the shared access gateway node comprises a gateway GPRS support node.

12. The article of claim 10, wherein the instructions when executed cause the first control node to further:
receive an indication that the handover is complete; and
send another command to the shared access gateway node to cause bicasting of the traffic data to stop.

13. The article of claim 10, wherein the instructions when executed cause the first control node to further:
receive a message containing an indication that a direct tunneling feature is supported, where the direct tunneling feature comprises providing a data function of the first control node in the shared access gateway node to enable direct communication of traffic data between the access gateway node and the corresponding radio network controllers over the direct data links that bypass respective control nodes.

14. The article of claim 10, wherein the instructions when executed cause the first control node to further:
receive a message containing an identifier of a tunnel between the source radio network controller and the shared access gateway node.

15. The article of claim 10, wherein the instructions when executed cause the first control node to further:
use a control function in the first control node to manage a corresponding one of a plurality of data functions in the shared access gateway node.

16. The article of claim 10, wherein receiving the message indicating that handover is requested comprises receiving the message indicating that one of a serving RNS (SRNS) handover and a packet-switched (PS) handover is requested.

17. An access gateway node, comprising:
data functions of corresponding control nodes, the control nodes comprising a source control node and a target control node involved in a handover procedure for a mobile station; and
a controller to:
receive at least one command from the source control node indicating that handover is to be performed;
perform a bicast start procedure responsive to the at least one command; and
in response to the bicast start procedure, bicast traffic data to source and target radio network controllers corresponding to the source and target control nodes, wherein bicasting the traffic data comprises sending the traffic data to each of the source and target radio network controllers, while bypassing respective source and target control nodes, wherein the source control node is for communicating control messages with the source radio network controller, and the target control node is for communicating control messages with the target radio network controller.

18. The access gateway node of claim 17, comprising a gateway GPRS support node, wherein the control nodes comprise serving GPRS support nodes.

19. The access gateway node of claim 17, the controller to further:

receive another command to stop bicasting of traffic data; and stop bicasting of the traffic data in response to the another command.

20. The access gateway node of claim 17, wherein the data functions are managed by respective control functions in the source and target control nodes.

* * * * *